United States Patent
Wu et al.

(10) Patent No.: US 11,734,347 B2
(45) Date of Patent: Aug. 22, 2023

(54) VIDEO RETRIEVAL METHOD AND APPARATUS, DEVICE AND STORAGE MEDIUM

(71) Applicant: LYNXI TECHNOLOGIES CO., LTD., Beijing (CN)

(72) Inventors: Zhenzhi Wu, Beijing (CN); Yaolong Zhu, Beijing (CN)

(73) Assignee: LYNXI TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 18/003,596

(22) PCT Filed: Jul. 7, 2021

(86) PCT No.: PCT/CN2021/104913
§ 371 (c)(1),
(2) Date: Dec. 28, 2022

(87) PCT Pub. No.: WO2022/007827
PCT Pub. Date: Jan. 13, 2022

(65) Prior Publication Data
US 2023/0229699 A1 Jul. 20, 2023

(30) Foreign Application Priority Data
Jul. 7, 2020 (CN) .......................... 202010647229.X (51) Int. Cl.
*G06F 16/30* (2019.01)
*G06F 16/75* (2019.01)
(Continued)

(52) U.S. Cl.
CPC .......... *G06F 16/75* (2019.01); *G06N 3/0464* (2023.01); *G06N 3/08* (2013.01)

(58) Field of Classification Search
CPC .......... G06F 16/75; G06N 3/0464; G06N 3/08
See application file for complete search history.

(56) References Cited

U.S. PATENT DOCUMENTS

| 2015/0310303 | A1* | 10/2015 | Andreopoulos | ....... G06N 3/049 382/158 |
| 2018/0349764 | A1* | 12/2018 | Zhang | .................... G06N 3/063 |

FOREIGN PATENT DOCUMENTS

| CN | 109901878 A | * | 6/2019 | .......... G06F 7/5443 |
| CN | 111104555 A | | 5/2020 | |

(Continued)

OTHER PUBLICATIONS

Article entitled "Computationally Efficient Spatio-Temporal Dynamic Texture Recognition for Volatile Organic Compound (VOC) Leakage Detection in Industrial Plants", by Badawi et al., dated May 2020 (Year: 2020).*

(Continued)

*Primary Examiner* — Mahesh H Dwivedi
(74) *Attorney, Agent, or Firm* — Browdy and Neimark, PLLC (57) ABSTRACT

A video retrieval method and apparatus, a device and a storage medium are provided. The method comprises the following steps: acquiring a comparison video clip from a video library according to the duration of a to-be-tested video (S110); determining the similarity between the to-be-tested video and the comparison video clip by a target spatio-temporal neural network, a spatio-temporal convolutional layer of the target spatio-temporal neural network being configured to be capable of performing two-dimensional convolution and temporal dimension information processing, respectively (S120); and traversing the video library, and outputting a retrieval result according to the similarity (S130).

8 Claims, 6 Drawing Sheets

(51) Int. Cl.
 *G06N 3/0464* (2023.01)
 *G06N 3/08* (2023.01)

(56) References Cited

FOREIGN PATENT DOCUMENTS

| | | | | |
|---|---|---|---|---|
| CN | 111241338 A | 6/2020 | | |
| CN | 111831852 A | * 10/2020 | ......... | G06F 16/7328 |
| CN | 111831852 A | 10/2020 | | |
| EP | 3293681 A1 | * 3/2018 | ............. | G06N 20/00 |

OTHER PUBLICATIONS

Article entitled "LIAF-Net: Leahy Integrate and Analog Fire Network for Lightweight and Efficient Spatiotemporal Information Processing", by Wu et al., dated Nov. 2022 (Year: 2022).*
(LU. Yaoyao, "Research on Video Retrieval Technology Based on 3D Convolutional Neural Network", Chinese Waster's Theses Full-text Database, Information Science and Technology, No. 6, Jun. 15, 2017, sections 2.2, 4.1-4.5, 5.2, and 6.1 (English abstract attached).
Luis A. Camufias-Mesa et al. Neuromorphic Spiking Neural Networks and Their Memristor-CMOS Hardware Implementations https://www.ncbi.nlm.nih.gov/pmc/articles/PMC6747825/, Aug. 27, 2019.

* cited by examiner

VIDEO RETRIEVAL METHOD AND APPARATUS, DEVICE AND STORAGE MEDIUM

CROSS-REFERENCE TO RELATED APPLICATIONS

The present application is a National Phase Application filed under 35 U.S.C. 371 as a national stage of PCT/CN2021/104913, filed on Jul. 7, 2021, an application claiming priority from Chinese Patent Application No. 202010647229.X, filed on Jul. 7, 2020 in the Chinese Intellectual Property Office, contents of which are hereby incorporated herein by reference in their entirety.

FIELD OF TECHNOLOGY

The present application relates to the technical field of videos, and in particular relates to a video retrieval method, a video retrieval apparatus, a device, and a storage medium.

BACKGROUND

Video retrieval refers to finding required videos or video clips from large amounts of video data. At present, the commonly used video retrieval modes are divided into two types: a spatial-based video retrieval mode and a temporal-spatial-based video retrieval mode.

The spatial-based video retrieval mode generally refers to extracting key frames of to-be-retrieved videos, and comparing the key frames with videos in a video library to find out required videos or video clips. Such retrieval mode is low in retrieval accuracy. For example, in a case that the to-be-retrieved video is a video with a hand in rotation, when the spatial-based video retrieval mode is configured for retrieval, the retrieval result can be obtained according to the position of the hand in each picture, but it is impossible to identify whether the hand is in clockwise or counterclockwise rotation, so the accuracy is not high.

The temporal-spatial-based video retrieval mode refers to performing retrieval by considering the temporal correlation between the frames of the to-be-retrieved videos. Such retrieval mode is high in retrieval accuracy, but computationally intensive and low in retrieval efficiency. For example, in a case that the to-be-retrieved video is a video with a hand in rotation, when the temporal-spatial-based video retrieval mode is configured for retrieval, the retrieval result can be obtained according to whether the hand is in clockwise or counterclockwise rotation, the accuracy is high, but the retrieval efficiency is low.

SUMMARY

The present application provides a video retrieval method, a video retrieval apparatus, a device and a storage medium to achieve rapid and large-scale video retrieval.

To achieve the objective above, the embodiment of the present application provides a video retrieval method, including the following steps: acquiring a comparison video clip from a video library according to the duration of a to-be-tested video; determining the similarity between the to-be-tested video and the comparison video clip by a target spatio-temporal neural network, a spatio-temporal convolutional layer of the target spatio-temporal neural network being configured to be capable of performing two-dimensional convolution and temporal dimension information processing, respectively; and traversing the video library, and outputting a retrieval result according to the similarity.

To achieve the objective above, the embodiment of the present application provides a video retrieval apparatus, including: an acquisition unit, configured to acquire a comparison video clip from a video library according to the duration of a to-be-tested video; a spatio-temporal unit, configured to determine the similarity between the to-be-tested video and the comparison video clip by a target spatio-temporal neural network, a spatio-temporal convolutional layer of the target spatio-temporal neural network being configured to be capable of performing two-dimensional convolution and temporal dimension information processing, respectively; and an output unit, configured to traverse the video library and to output a retrieval result according to the similarity.

To achieve the objective above, the embodiment of the present application provides a device. The device includes: one or more processors; and a memory, configured to store one or more programs, wherein the one or more programs, when executed by the one or more processors, enable the one or more processors to implement the steps of the above method.

To achieve the objective above, the embodiment of the present application provides a storage medium, having computer programs stored thereon. The computer programs, when executed by the processors, are configured to implement the steps of the above method.

DESCRIPTION OF THE EMBODIMENTS

To make the objective, the technical solution and the advantages of the present application more clearly, the present application is further described in detail below with reference to the accompanying drawings and the embodiments. It should be understood that the specific embodiments described here are used only to explain the present application rather than limiting the present application. It needs to be noted that although the functional module divisions are performed in the device schematic and the logical sequence is shown in the flowchart, in some cases it is possible to perform the steps shown or described in a different order than the module divisions in the device, or in the flowchart.

The embodiments of the present application are further described below with reference to the accompanying drawings.

Figure 1:
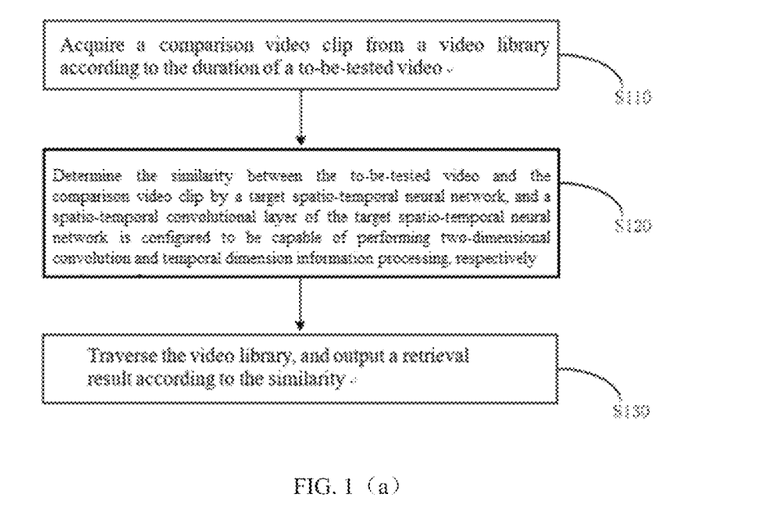
FIG. 1(a) is a flowchart of a video retrieval method in accordance with an embodiment of the present application.
FIG. 1(b) is a flowchart of an implementation manner of the step S120.
FIG. 1(c) is a flowchart of an implementation manner of executing the step S121 by each level of spatio-temporal convolutional sub-layer.
FIG. 1(d) is a flowchart of an implementation manner of the step S121 when the spatio-temporal convolutional layer comprises one level of spatio-temporal convolutional sub-layer.

As shown in FIG. 1(a), FIG. 1(a) is a flowchart of a video retrieval method in accordance with an embodiment of the present application. The video retrieval method includes, but is not limited to, step S110, step S120, and step S130.

In the step S110, a comparison video clip is obtained from a video library according to the duration of a to-be-tested video.

In a case of performing video retrieval, for example, a video copyright retrieval mechanism needs to rapidly detect whether the tested video copies a video in a copyright video library (hereinafter referred to as the video library) or not, i.e., finding whether the tested video is similar to the video in the video library or not, and if the tested video is similar to the video in the video library, the video copyright retrieval mechanism needs to position the similar time period of the similar video in the video library. Due to the large number and scale of videos in the video library used for retrieval, both high retrieval accuracy and fast searching speed are required when performing video retrieval.

For the videos in the video library, the comparison video clip can be extracted by a sliding window, the duration of the comparison video clip is basically equal to that of the to-be-tested video, and the basically equal here refers to that a difference value between the duration of the comparison video clip and the duration of the to-be-tested video is within an error range. For example, the error range may be ±30 s, that is, the duration of the comparison video clip may be equal to the duration of the to-be-tested video, or may be 30 s longer than the duration of the to-be-tested video at most, or may be 30 s shorter than the duration of the to-be-tested video at most. Certainly, the present disclosure is not limited thereto, the error range may also be determined according to specific application scenarios and the ability of the hardware for executing the video retrieval method.

In the step S120, the similarity between the to-be-tested video and the comparison video clip is determined by a target spatio-temporal neural network, and a spatio-temporal convolutional layer of the target spatio-temporal neural network is configured to be capable of performing two-dimensional convolution and temporal dimension information processing, respectively.

The spatio-temporal convolutional layer of the target spatio-temporal neural network may be configured to perform two-dimensional convolution to process spatial features of the to-be-tested video and the comparison video clip and then to process the temporal dimension information of the to-be-tested video and the comparison video clip. Therefore, the spatio-temporal feature extraction with low complexity is achieved by processing the spatial features and the temporal dimension information successively.

If the similarity between the to-be-tested video and the comparison video clip exceeds a similarity threshold value, information characterizing the detection of the similar video is output, and the start temporal and the end temporal of the current sliding window are output.

In the step S130, the video library is traversed, and then a retrieval result is output according to the similarity. Traversing the video library includes: repeating the step S120, traversing the video through the sliding window, outputting the temporal information of the comparison video clip, of which the similarity with the to-be-tested video is greater than or equal to the similarity threshold value, in the video. The step S120 is repeated, other videos in the video library are traversed through the sliding window, and the temporal information of the comparison video clip, of which the similarity with the to-be-tested video is greater than or equal to the similarity threshold value, in the other videos is output.

In the present disclosure, how to specifically execute the step S120 is not specially limited. The specific implementation manner of the step S120 may be determined according to the specific composition of the target spatio-temporal neural network.

Figure 2:
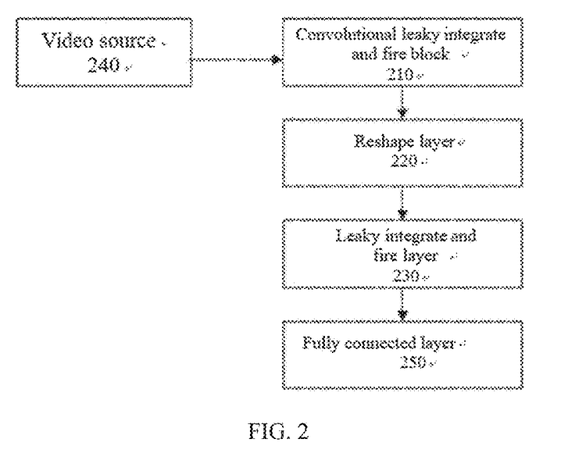
FIG. 2 is a structure diagram of a target spatio-temporal neural network in accordance with an embodiment of the present application.

As shown FIG. 2, FIG. 2 is a structure diagram of a target spatio-temporal neural network in accordance with an embodiment of the present application. The target spatio-temporal neural network includes, but is not limited to, a convolutional leaky integrate and fire block 210 (ConvLIF Block), a reshape layer 220, a leaky integrate and fire (LIF) layer 230, and a fully connected layer 250. Correspondingly, as shown in FIG. 1(b), the step S120 may include:

In the step S121, at least one temporal of temporal sequence feature extraction is performed on a frame image of the to-be-tested video and a frame image of the comparison video clip by a spatio-temporal convolutional layer of the target spatio-temporal neural network.

In the step S122, spatial dimension processing is performed on the extracted temporal sequence features by a reshape layer of the target spatio-temporal neural network.

In the step S123, spatial information is output by the leaky integrate and fire layer of the target spatio-temporal neural network according to the processed spatial dimension.

In the step S124, the similarity between the to-be-tested video and the comparison video clip is obtained by the fully connected layer of the target spatio-temporal neural network according to the spatial information.

According to the operation requirements, alternatively, the ConvLIF Block may include at least one level of spatio-temporal convolutional sub-layer. In the step S121, each temporal sequence feature extraction is executed by the corresponding spatio-temporal convolutional sub-layer. That is, when the spatio-temporal convolutional layer of the target spatio-temporal neural network includes one level of spatio-temporal convolutional sub-layer, one temporal of temporal sequence feature extraction is executed in the step S121. When the spatio-temporal convolutional layer of the target spatio-temporal neural network includes N levels of spatio-temporal convolutional sub-layers, N temporals of temporal sequence feature extraction are executed, where N is a natural number greater than 1. Correspondingly, as shown in FIG. 1(c), the step of performing the corresponding temporal sequence feature extraction by each level of spatio-temporal convolutional sub-layer comprises:

In the step S121a, two-dimensional convolution is performed on to-be-processed data by the two-dimensional convolutional leaky integrate and fire block of the current level of spatio-temporal convolutional sub-layer, and the temporal dimension information of the to-be-processed data is processed to obtain original temporal sequence features.

In the step S121b, the original temporal sequence features are normalized by a normalization layer of the current level of spatio-temporal convolutional sub-layer.

In the step S121c, linear processing is performed on the normalized original temporal sequence features by the linear layer of the current level of spatio-temporal convolutional layer.

In the step S121d, the linearized original temporal sequence features are integrated by the average pooling layer of the current level of spatio-temporal convolutional sub-layer and then output.

In the step S122 of performing spatial dimension processing on the extracted temporal sequence features by the reshape layer of the target spatio-temporal neural network, the extracted temporal sequence features are the temporal sequence features output by the average pooling layer of the last level of the spatio-temporal convolutional sub-layer.

Moreover, for the first level of spatio-temporal convolutional sub-layer, the to-be-processed data are continuous video frames. For the non-first level of spatio-temporal convolutional sub-layer, the to-be-processed data is an output of the previous level of spatio-temporal convolutional sub-layer.

It needs to be noted that when the number of levels of the spatio-temporal convolutional sub-layers is two or more, all the levels of the spatio-temporal convolutional sub-layers are coupled. In the step S121, the next level of spatio-temporal convolutional sub-layer is configured to perform temporal sequence feature extraction again on the output of the previous level of the spatio-temporal convolutional sub-layer.

The number of levels of the LIF layer may be one or more. If the number of levels of the LIF layer is more than one, various levels of the LIF layers are in a cascade relationship.

An input of the ConvLIF Block is a video source 240 with two-dimensional spatial dimension and one-dimensional temporal dimension (i.e., spatio-temporal information, and the spatial dimension is two-dimensional). The video source 240 includes a to-be-tested video and a comparison video clip. The ConvLIF Block is configured to perform temporal sequence feature extraction on the video source 240, the output spatial dimension is two-dimensional spatio-temporal information. The Reshape layer is configured to convert the spatial dimension of the output spatio-temporal information of the ConvLIF Block into one dimension without changing the temporal dimension. The LIF layer is configured to process the spatio-temporal information (the spatial dimension is one-dimensional) output by the Reshape layer, to overlay the spatial information of other temporal points to the spatial information of the last temporal point, and to output the spatial information of the last temporal point. The fully connected layer is configured to receive the spatial information (the spatial dimension is one-dimensional) output by the LIF layer and to output binary classification, i.e., the to-be-tested video is similar to, or different from, the comparison video clip.

Figure 3:
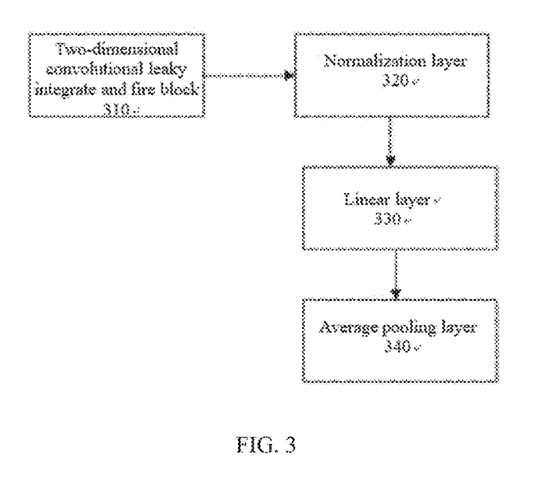
FIG. 3 is a structure diagram of a target spatio-temporal convolutional layer in accordance with an embodiment of the present application.

As shown in FIG. 3, FIG. 3 is a structure diagram of a spatio-temporal convolutional layer in accordance with an embodiment of the present application. When the number of levels of the spatio-temporal convolutional sub-layer is one, FIG. 3 illustrates a structure diagram of the spatio-temporal convolutional layer. When the number of levels of the spatio-temporal convolutional sub-layer is two or more, FIG. 3 illustrates a structure diagram of a single spatio-temporal convolutional sub-layer. In a case that the number of levels of the spatio-temporal convolutional sub-layer is two or more, an input of the first level of spatio-temporal convolutional sub-layer is a video source with two-dimensional spatial dimension and one-dimensional temporal dimension. The video source includes a to-be-tested video and a comparison video clip, and an input of the subsequent spatio-temporal convolutional sub-layer is an output of the previous level of spatio-temporal convolutional sub-layer.

The structure of the spatio-temporal convolution layer is exemplarily illustrated below in a case that the number of levels of spatio-temporal convolutional sub-layers of the spatio-temporal convolution layer is one. The spatio-temporal convolutional sub-layer of the spatio-temporal convolutional layer includes, but is not limited to, a two-dimensional convolutional leaky integrate and fire (ConvLIF2D) block 310, a normalization layer 320 a linear (RELU) layer 330, and an average pooling (AvgPooling) layer 340.

Accordingly, as shown in FIG. 1(d), the step S121 may include:

In the step S121a, the temporal dimension information of continuous video frames is processed after the two-dimensional convolution is performed on the continuous video frames by the ConvLIF2D block, thus obtaining the original temporal sequence features.

In the step S121b, the original temporal sequence features are normalized by the normalization layer, thus guaranteeing the stability of the target spatio-temporal neural network and effectively reducing the probability that over-fitting possibly occurs when the original spatio-temporal neural network is trained. In the embodiment, the normalization layer may be implemented with batch normalization, or layer normalization.

In the step S121c, the linear processing is performed on the normalized original temporal sequence features by the RELU layer, and a nonlinear relationship between the layers of the target spatio-temporal neural network may be increased by the RELU layer.

In the step S121d, the linearized original temporal sequence features are integrated by the average pooling layer and then output. The average pooling layer can, one the one hand, prevent useless parameters from increasing the temporal complexity, and on the other hand, increase the integration level of the features.

In the embodiment, the average pooling layer may optionally be implemented with an average pooling function (AvgPooling2D) with 2D inputs with temporal domain expansion, or an average pooling function (AvgPooling3D) with 3D inputs.

In accordance with a video retrieval method provided by the embodiment, in the process of determining the similarity between the to-be-tested video and the comparison video clip by the target spatio-temporal neural network, the spatio-temporal convolutional layer of the target spatio-temporal neural network is configured to perform two-dimensional convolution to process spatial features of the to-be-tested video and the comparison video clip and then to process the temporal dimension information of the to-be-tested video and the comparison video clip. Therefore, the spatio-temporal feature extraction with low complexity is achieved by processing the spatial features and the temporal dimension information successively. Compared with a mode of extracting the spatio-temporal features by a spatio-temporal convolution operator in the prior art, the operational quantity is smaller, the processing speed is faster, and the retrieval efficiency is higher.

Figure 4:
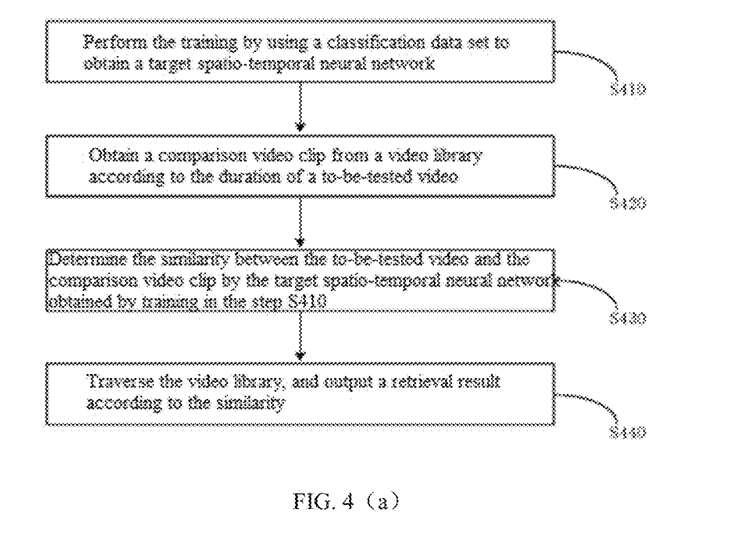
FIG. 4(a) is a flowchart of a video retrieval method in accordance with another embodiment of the present application.
FIG. 4(b) is a flowchart of an implementation manner of the step S410.

As shown in FIG. 4(a), FIG. 4(a) is a flowchart of a video retrieval method in accordance with another embodiment of the present application. The video retrieval method includes, but is not limited to, step S410, step S420, step S430, and step S440.

In the step S410, the training is performed by using a classification data set to obtain a target spatio-temporal neural network. As an alternative implementation manner, as shown in FIG. 4(b), the step S410 may include: in the step S411, an original spatio-temporal neural network is trained by using a classification data set to obtain a pre-trained network, where the original spatio-temporal neural network includes a fully connected layer taking the number of classifications as the number of output nodes. In the step S412, the fully connected layer in the pre-trained network is replaced with a binary-classification fully connected layer so as to obtain a target spatio-temporal neural network.

In the step S420, a comparison video clip is obtained from a video library according to the duration of a to-be-tested video.

In the step S430, the similarity between the to-be-tested video and the comparison video clip is determined by the target spatio-temporal neural network obtained by training in the step S410, and a spatio-temporal convolutional layer of the target spatio-temporal neural network is configured to be capable of performing two-dimensional convolution and temporal dimension information processing, respectively.

If the similarity between the to-be-tested video and the comparison video clip exceeds a similarity threshold value, the information characterizing the detection of the similar video is output, and the start temporal and the end temporal of the current sliding window are output.

In the step S440, the video library is traversed, and then a retrieval result is output according to the similarity. Traversing the video library includes: repeating the step S430, traversing the video through the sliding window, outputting the temporal information of the comparison video clip with the similarity greater than or equal to the similarity threshold value in the video. The step S430 is repeated, other videos in the video library are traversed through the sliding window, and the temporal information of the comparison video clip with the similarity greater than or equal to the similarity threshold value in the other videos is output.

In accordance with a video retrieval method provided by the embodiment, in the process of determining the similarity between the to-be-tested video and the comparison video clip by the target spatio-temporal neural network, the spatio-temporal convolutional layer of the target spatio-temporal neural network is configured to perform two-dimensional convolution to process spatial features of the to-be-tested video and the comparison video clip and then to process the temporal dimension information of the to-be-tested video and the comparison video clip. Therefore, the spatio-temporal feature extraction with low complexity is achieved by processing the spatial features and the temporal dimension information successively. Compared with a mode of extracting the spatio-temporal features by a spatio-temporal convolution operator in the prior art, the operational quantity is smaller, the processing speed is faster, and the retrieval efficiency is higher.

Figure 5:
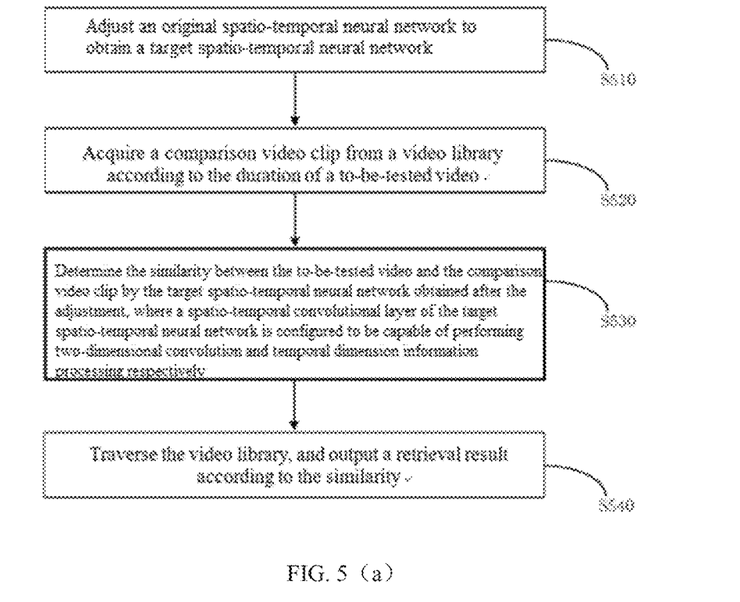
FIG. 5(a) is a flowchart of a video retrieval method in accordance with another embodiment of the present application.
FIG. 5(b) and FIG. 5(c) are flowcharts of an implementation manner of the step S510.

As shown in FIG. 5(a), FIG. 5(a) is a flowchart of a video retrieval method in accordance with another embodiment of the present application. The video retrieval method includes, but is not limited to, step S510, step S520, step S530, and step S540.

In the step S510, an original spatio-temporal network is adjusted to obtain a target spatio-temporal neural network.

As shown in FIG. 5(b) and FIG. 5(c), adjusting the original spatio-temporal neural network includes, but is not limited to: in the step S511, video clips are selected from a tested video, or video clips are selected from the tested video and a negative sample video to be input into the original spatio-temporal neural network, thus obtaining a similarity result between the input video clips. In the step S512, the similarity result is compared with a preset label to determine a loss function of the original spatio-temporal neural network. In the step S513, a training weight for the next training is determined according to the loss function so as to train the original spatio-temporal neural network until the training conditions are satisfied, thus obtaining the target spatio-temporal neural network.

In the step S520, a comparison video clip is obtained from a video library according to the duration of a to-be-tested video.

In the step S530, the similarity between the to-be-tested video and the comparison video clip is determined by the target spatio-temporal neural network obtained after the adjustment in the step S510, and a spatio-temporal convolutional layer of the target spatio-temporal neural network is configured to be capable of performing two-dimensional convolution and temporal dimension information processing, respectively.

If the similarity between the to-be-tested video and the comparison video clip exceeds a similarity threshold value, the information characterizing the detection of the similar video is output, and the start temporal and the end temporal of the current sliding window are output.

In the step S540, the video library is traversed, and then a retrieval result is output according to the similarity. Traversing the video library includes: repeating the step S530, traversing the video through the sliding window, outputting the temporal information of the comparison video clip with the similarity greater than or equal to the similarity threshold value in the video. The step S530 is repeated, other videos in the video library are traversed through the sliding window, and the temporal information of the comparison video clip with the similarity greater than or equal to the similarity threshold value in the other videos is output.

In accordance with a video retrieval method provided by the embodiment, in the process of determining the similarity between the to-be-tested video and the comparison video clip by the target spatio-temporal neural network, the spatio-temporal convolutional layer of the target spatio-temporal neural network is configured to perform two-dimensional convolution to process spatial features of the to-be-tested video and the comparison video clip and then to process the temporal dimension information of the to-be-tested video and the comparison video clip. Therefore, the spatio-temporal feature extraction with low complexity is achieved by processing the spatial features and the temporal dimension information successively. Compared with a mode of extracting the spatio-temporal features by a spatio-temporal convolution operator in the prior art, the operational quantity is smaller, the processing speed is faster, and the retrieval efficiency is higher.

Figure 6:
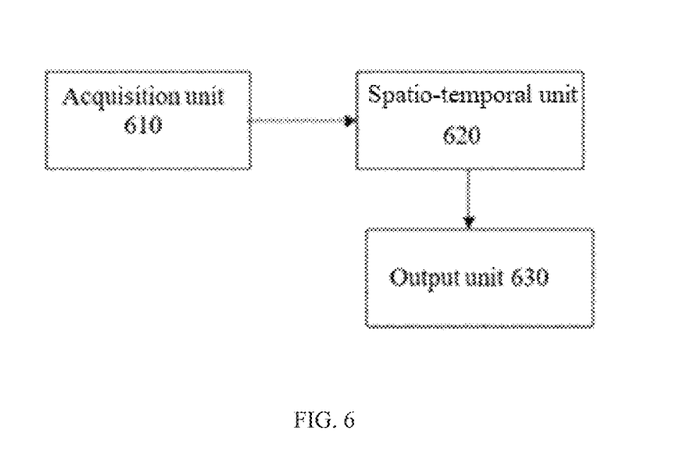
FIG. 6 is a structure diagram of a video retrieval apparatus in accordance with an embodiment of the present application.

As shown in FIG. 6, FIG. 6 is a structure diagram of a video retrieval apparatus in accordance with an embodiment of the present application. The video retrieval apparatus includes, but is not limited to, an acquisition unit 610, a spatio-temporal unit 620, and an output unit 630.

The acquisition unit 610 is configured to acquire a comparison video clip from a video library according to the duration of a to-be-tested video.

The spatio-temporal unit 620 is configured to determine the similarity between the to-be-tested video and the comparison video clip by a target spatio-temporal neural network, and a spatio-temporal convolutional layer of the target spatio-temporal neural network is configured to be capable of performing two-dimensional convolution and temporal dimension information processing, respectively.

The output unit 630 is configured to traverse the video library and then to output a retrieval result according to the similarity.

In an implementation manner of an instance, the spatio-temporal unit is configured to: perform at least one temporal of temporal sequence feature extraction on a frame image of the to-be-tested video and a frame image of the comparison video clip by the spatio-temporal convolutional layer of the target spatio-temporal neural network, respectively; perform spatial dimension processing on the extracted features by a reshape layer of the target spatio-temporal neural network; output spatial information by beams of a leaky integrated and fire layer of the target spatio-temporal neural network according to the processed spatial dimension; and obtain the similarity between the to-be-tested video and the comparison video clip by a fully connected layer of the target spatio-temporal neural network according to the spatial information.

In an implementation manner of an instance, the training unit is configured to perform training by using a classification data set to obtain the target spatio-temporal neural network.

In an implementation manner of an instance, the training unit is configured to: train an original spatio-temporal neural network by using the classification data set to obtain a pre-trained network, where the original spatio-temporal neural network includes a fully connected layer taking the number of classifications as the number of output nodes; and replace the fully connected layer in the pre-trained network with a binary-classification fully connected layer so as to obtain the target spatio-temporal neural network.

In an implementation manner of an instance, an adjusting unit is configured to: select video clips from the tested video, or select video clips from the tested video and a negative sample video to be input into the original spatio-temporal neural network, thus obtaining a similarity result between the input video clips; compare the similarity result with a preset label to determine a loss function of the original spatio-temporal neural network; and determine a training weight for next training according to the loss function so as to train the original spatio-temporal neural network until the training conditions are satisfied, thus obtaining the target spatio-temporal neural network.

The video retrieval apparatus provided by the embodiment may be configured to execute the video retrieval method provided by any embodiment of the present invention, and has corresponding functional modules and beneficial effects for executing the method. Technical details not exhaustively described in this embodiment may be referred to the video retrieval method in accordance with any embodiment of the present invention.

It needs to be noted that, in the embodiment of the video retrieval apparatus, each unit and module included in the video retrieval apparatus are only divided according to functional logic, but are not limited to the division as long as the corresponding functions can be achieved. In addition, the specific names of the functional units are also only for ease of distinguishing each other and are not intended to limit the scope of protection of the present application.

In accordance with a video retrieval apparatus provided by the embodiment, in the process of determining the similarity between the to-be-tested video and the comparison video clip by the target spatio-temporal neural network, the spatio-temporal convolutional layer of the target spatio-temporal neural network is configured to perform two-dimensional convolution to process spatial features of the to-be-tested video and the comparison video clip and then to process the temporal dimension information of the to-be-tested video and the comparison video clip. Therefore, the spatio-temporal feature extraction with low complexity is achieved by processing the spatial features and the temporal dimension information successively. Compared with a mode of extracting the spatio-temporal features by a spatio-temporal convolution operator in the prior art, the operational quantity is smaller, the processing speed is faster, and the retrieval efficiency is higher.

Figure 7:
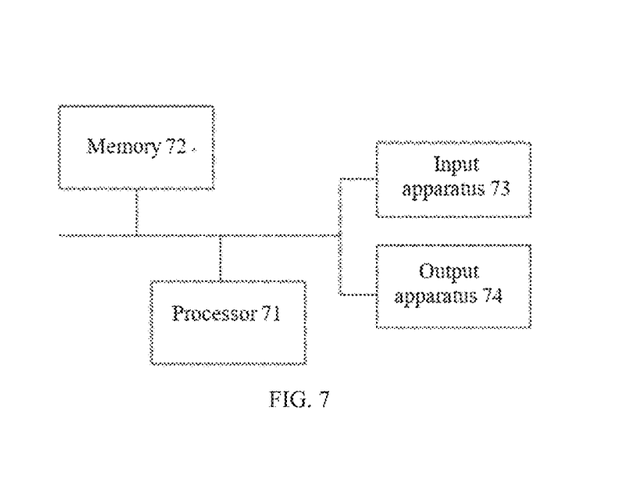
FIG. 7 is a structure diagram of a device in accordance with an embodiment of the present application.

The embodiment of the present application further provides a device. FIG. 7 is a structure diagram of a device in accordance with an embodiment of the present application. As shown in FIG. 7, the device comprises a processor 71, a memory 72, an input apparatus 73, and an output apparatus 74. The number of the processors 71 in the device may be one or more. One processor 71 is taken as an example in FIG. 7. The processor 71, the memory 72, the input apparatus 73, and the output apparatus 74 in the device may be connected via a bus or in other ways, and the connection via a bus is taken as an example in FIG. 7.

The memory 72, as a computer readable storage medium, may be configured to store software programs, computer executable programs and modules, such as program instructions/modules corresponding to the video retrieval apparatus in the embodiment of the present application (e.g., the acquisition unit 610, the spatio-temporal unit 620 and the output unit 630 in the video retrieval apparatus). The processor 71 is configured to execute various functional applications and data processing of the device by running the software programs, the instructions and modules stored in the memory 72, i.e., to implement any method in accordance with the embodiment of the present application.

The memory 72 may mainly include a program storage area and a data storage area, where the program storage area may store an operating system, an application program required for at least one function; and the data storage area may store data created according to the use of the device, or the like. In addition, the memory 72 may include a high-speed random-access memory and may also include a non-volatile memory, such as at least one magnetic disk storage device, a flash memory device, or other non-volatile solid-state storage devices. In some instances, the memory 72 may further include memories remotely provided with respect to the processor 71, these remote memories may be connected to the device over a network. The instances of the networks include, but are not limited to, the Internet, the Intranets, local area networks, mobile communication networks, and combinations thereof.

The input apparatus 73 may be configured to receive input digital or character information, and to generate key signal input related to the user settings and the functional control of the device. The input apparatus 74 may include a display screen and other display devices.

The embodiment of the present application further provides a storage medium including computer executable instructions. The computer executable instructions, when executed by the computer processor, are configured to execute a video retrieval method. The method includes the following steps:

acquiring a comparison video clip from a video library according to the duration of a to-be-tested video;

determining the similarity between the to-be-tested video and the comparison video clip by a target spatio-temporal neural network, a spatio-temporal convolutional layer of the target spatio-temporal neural network being configured to be capable of performing two-dimensional convolution and temporal dimension information processing, respectively; and traversing the video library, and outputting a retrieval result according to the similarity.

Certainly, in accordance with the storage medium containing the computer executable instructions provided by the present invention, the computer executable instructions are not limited to the operation of the video retrieval method and may also be configured to execute the related operations in the video retrieval method provided by any embodiment of the present application.

From the above description of the implementation manner, it is apparent to those skilled in the art that the present application can be implemented by software and necessary general-purpose hardware, but of course also by hardware, although in many cases the former is a preferred embodiment. Based on such an understanding, the technical solutions in this application essentially, or the part contributing to the prior art may be implemented in the form of a software product. The computer software product may be stored in a computer readable storage medium, such as a software disk of the computer, a read-only memory (ROM), a random-access memory (RAM), a flash, a hard disk or an optical disk, and includes several instructions for instructing a computer device (which may be a personal computer, a server, a network device, or the like) to perform the methods in the embodiments of the present application.

The foregoing is merely exemplary embodiments of the present application and is not intended to limit the scope of the present application.

Those skilled in the art should appreciate that the term "user terminal" encompasses any suitable type of wireless user nodes, such as mobile telephones, portable data processing devices, portable web browsers, or vehicle-mounted mobile stations.

In general, the various embodiments of the present application may be implemented in hardware or private circuits, software, logics or any combination thereof. For example, some aspects may be implemented in hardware, while other aspects may be implemented in firmware or software which may be executed by a controller, microprocessor or other computing device, although the present application is not limited thereto.

The embodiments of the present application may be implemented by the execution of computer program instructions by a data processor of the mobile device, e.g., in the processor entity, or by hardware, or by a combination of software and hardware. Computer readable program instructions may be assembler instructions, instruction-set-architecture (ISA) instructions, machine instructions, machine dependent instructions, microcode, firmware instructions, state-setting data, or either source code or object code written in any combination of one or more programming languages.

The block diagrams of any logic flow in the drawings of the present application may represent program steps, or may represent interconnected logic circuits, modules, and functions, or may represent a combination of program steps, logic circuits, modules, and functions. The computer program may be stored in a memory. The memory may be in any type suitable for the local technical environment and may be implemented using any suitable data storage technology, for example, but not limited to, a read-only memory (ROM), a random-access memory (RAM), and an optical memory apparatus and system (a digital video disk (DVD) or a compact disk (CD)). The computer-readable storage medium may include a non-transitory storage medium. The data processor may be in any type suitable for the local technical environment, for example, but not limited to, a general-purpose computer, a special-purpose computer, a microprocessor, a digital signal processor (DSP), an application specific integrated circuit (ASIC), a field-programmable gate array (FGPA), and a processor based on a multi-core processor architecture.

The exemplary embodiments of the present application are illustrated in detail above by exemplary and non-limiting examples. For those of ordinary skill in the art, various modifications and adjustments to the above embodiments can be obviously derived from the accompanying drawings and the appended claims, but those modifications and adjustments are not beyond the scope of the present invention. Therefore, the proper scope of the present invention is defined by the appended claims.

The invention claimed is:

1. A video retrieval method, comprising:
   acquiring a comparison video clip from a video library according to the duration of a to-be-tested video;
   determining the similarity between the to-be-tested video and the comparison video clip by a target spatio-temporal neural network, a spatio-temporal convolutional layer of the target spatio-temporal neural network being configured to be capable of performing two-dimensional convolution and temporal dimension information processing, respectively; and
   traversing the video library, and outputting a retrieval result according to the similarity;
   wherein the determining the similarity between the to-be-tested video and the comparison video clip by a target spatio-temporal neural network comprises:
   performing at least one temporal of temporal sequence feature extraction on a frame image of the to-be-tested video and a frame image of the comparison video clip by a spatio-temporal convolutional layer of the target spatio-temporal neural network;
   performing spatial dimension processing on the extracted temporal sequence features by a reshape layer of the target spatio-temporal neural network;
   outputting spatial information by a leaky integrate and fire layer of the target spatio-temporal neural network according to the processed spatial dimension; and
   obtaining the similarity between the to-be-tested video and the comparison video clip by a fully connected layer of the target spatio-temporal neural network according to the spatial information.

2. The method according to claim 1, wherein the spatio-temporal convolutional layer comprises at least one level of spatio-temporal convolutional sub-layer, and each level of spatio-temporal convolutional sub-layer comprises a two-dimensional convolutional leaky integrate and fire block, a normalization layer, a linear layer and an average pooling layer;
   in the step of performing at least one temporal of temporal sequence feature extraction on the frame image of the to-be-tested video and the frame image of the comparison video clip by the spatio-temporal convolutional layer of the target spatio-temporal neural network, the corresponding temporal sequence feature extraction step is performed by various levels of the spatio-temporal convolutional sub-layers, and the corresponding temporal sequence feature extraction step performed by each level of spatio-temporal convolutional sub-layer comprises the following steps:

performing two-dimensional convolution on to-be-processed data by the two-dimensional convolutional leaky integrate and fire block of the current level of spatio-temporal convolutional sub-layer, and processing temporal dimension information of the to-be-processed data to obtain original temporal sequence features;

normalizing the original temporal sequence features by the normalization layer of the current level of spatio-temporal convolutional sub-layer;

performing linear processing on the normalized original temporal sequence features by the linear layer of the current level of spatio-temporal convolutional layer; and outputting the linearized original temporal sequence features after the linearized original temporal sequence features are integrated by the average pooling layer of the current level of spatio-temporal convolutional sub-layer, wherein in the step of performing the spatial dimension processing on the extracted temporal sequence features by the reshape layer of the target spatio-temporal neural network, the extracted temporal sequence features are temporal sequence features output by the average pooling layer of the last level of spatio-temporal convolutional sub-layer, and for the first level of spatio-temporal convolutional sub-layer, the to-be-processed data are continuous video frames; and for a non-first level of spatio-temporal convolutional sub-layer, the to-be-processed data is an output of the previous level of spatio-temporal convolutional sub-layer.

3. The method according to claim 2, wherein the number of levels of the spatio-temporal convolutional sub-layers is two or more, and all the levels of the spatio-temporal convolutional sub-layers are coupled.

4. The method according to claim 1, wherein, before acquiring the comparison video clip from the video library according to the duration of the to-be-tested video, the method further comprises:

performing training by using a classification data set to obtain the target spatio-temporal neural network.

5. The method according to claim 4, wherein the performing training by using a classification data set to obtain the target spatio-temporal neural network comprises:

training an original spatio-temporal neural network by using the classification data set to obtain a pre-trained network, wherein the original spatio-temporal neural network comprises a fully connected layer which takes the number of classifications as the number of output nodes; and replacing the fully connected layer in the pre-trained network with a binary-classification fully connected layer so as to obtain the target spatio-temporal neural network.

6. The method according to claim 1, wherein, before acquiring the comparison video clip from the video library according to the duration of the to-be-tested video, the method further comprises:

selecting video clips from the tested video, or selecting video clips from the tested video and a negative sample video to input into the original spatio-temporal neural network so as to obtain a similarity result between the input video clips;

comparing the similarity result with a preset label to determine a loss function of the original spatio-temporal neural network; and determining a training weight of the next training according to the loss function so as to train the original spatio-temporal neural network until training conditions are satisfied, thus obtaining the target spatio-temporal neural network.

7. A device, comprising:
one or more processors; and
a memory, configured to store one or more programs;
wherein the one or more programs, when executed by one or more processors, enable the one or more processors to implement the method according to claim 1.

8. A non-transitory storage medium, having computer programs stored thereon, wherein the computer programs, when executed by the processors, are configured to implement the method according to claim 1.

* * * * *